Patented Aug. 29, 1939

2,170,989

UNITED STATES PATENT OFFICE 2,170,989

ALKYL HALO-DIPHENYLOXIDES

Gerald H. Coleman and Robert R. Dreisbach, Midland, Mich., assignors to The Dow Chemical Company, Midland, Mich., a corporation of Michigan No Drawing. Application March 29, 1937, Serial No. 133,645

9 Claims. (Cl. 260—612)

The present invention concerns certain new alkylated halo-diphenyloxides and mixtures thereof, as well as a method of making the same. The alkyl-halo-dipehnyloxide products herein disclosed vary from oily liquids to resinous solids at room temperature. They comprise new compounds which contain at least one alkyl radical having two or more carbon atoms and at least one nuclear halogen atom per molecule. The products are particularly valuable as dielectric agents in condensers, transformers, and other electric equipment, being less flammable and more fluid than many other such dielectrics; they may also be employed as plasticizers in resins, varnishes, etc.

The products are prepared by successively halogenating and alkylating diphenyloxide as hereinafter described. Said reactions may be carried out in any desired order, i. e., the diphenyloxide may be first halogenated and then alkylated, or first alkylated and then halogenated.

The invention, then, consists in the new products and methods hereinafter fully described and particularly pointed out in the claims, the following description setting forth but several of the ways in which the principle of the invention may be employed.

In preparing an alkylated halo-diphenyloxide, diphenyloxide is preferably first halogenated, e. g., by reaction with chlorine or bromine as described in U. S. Patent 2,022,634, to obtain a halo-diphenyloxide containing from one to six halogen atoms per molecule. The halo-diphenyloxide is then treated with a small proportion, e. g., between 0.01 and 0.05 molecular equivalent of aluminum chloride, after which an alkyl halide or an olefine is gradually introduced while maintaining the mixture at a reaction temperature. Examples of such alkyl halides and olefines are:—methyl chloride, ethyl chloride, ethyl bromide, normal propyl bromide, isopropyl chloride, normal butyl chloride, isobutyl chloride, ethylene, propylene, normal butylene, isobutylene, etc. The temperature required for the reaction varies somewhat with the alkyl halide or olefine employed, the kind and proportion of catalyst used in the reaction, and the extent of alkylation desired. However, the reaction usually occurs smoothly at temperatures between 125° and 175° C., but may sometimes be carried out at lower or higher temperatures, e. g., about 50° or 225° C.

When the reaction is completed the mixture is cooled, washed with aqueous hydrochloric acid to remove the catalyst, neutralized with an aqueous alkali, dried, and heated to vaporize therefrom any unreacted alkyl halide or olefine. The residual product is usually a liquid mixture of alkylated halo-diphenyloxides comprising isomeric compounds and non-uniformly alkylated compounds containing varying numbers of alkyl substituents. If desired, individual alkyl-halo-diphenyloxides may be separated from such mixtures by distillation or otherwise, but the mixtures themselves possess properties rendering them well suited to use for certain industrial purposes, e. g., as dielectric agents.

By reacting a halo-diphenyloxide simultaneously or successively with two or more alkyl halides or olefines in the manner just described, an alkylated halo-diphenyloxide containing two or more different alkyl radicals, e. g., methyl-ethyl-brom-diphenyloxide, ethyl-isopropyl-dichlor-diphenyloxide, etc., may be produced. Likewise, useful mixtures may be produced by alkylating a mixture of two or more halo-diphenyloxides in the above-disclosed manner.

Our new alkyl-halo-diphenyloxide products may also be prepared by first alkylating diphenyloxide in accordance with procedure similar to that described above and thereafter halogenating the alkylated diphenyloxide, preferably at elevated temperatures in the presence of a nuclear halogenation catalyst, such as iron chloride. The reaction temperature required for the halogenation depends somewhat upon the halogen employed in such reaction. When bromine is used the halogenation proceeds satisfactorily at temperatures above 75° C., whereas the reaction with chlorine occurs most smoothly at temperatures above 125° C. After completing the halogenation the reaction mixture is cooled, neutralized, and dried. The dried product is usually a mixture of isomeric and other closely related, e. g. homologous, alkyl-halo-diphenyl-oxides. It may be used without further treatment for dielectric purposes, etc. If desired, it may be separated by distillation or otherwise into its components, which may be used as dielectric agents, as intermediates from which other products may be prepared, and so forth.

The following examples illustrate a number of ways in which the principle of our invention has been employed, but are not to be construed as limiting the invention:—

*Example 1*

A mixture of 0.2 gram-mol of aluminum chloride (AlCl$_3$) and 9.0 gram-moles (1822 grams) of crude monochlor-diphenyloxide, (having a boiling point of about 125° to 145° C. at 2.5 to 5 millimeters absolute pressure, a specific gravity of about 1.20, and a chlorine content of 16.6 per cent by weight) was heated to and maintained at a temperature of 150° C., while 8.6 moles (555 grams) of ethyl chloride was passed thereinto during 6.0 hours. The reaction product was washed first with 250 c. c. of concentrated hydrochloric acid, then with aqueous sodium carbonate solution, and finally dried over calcium chloride. There was obtained 2021 grams of a light oily liquid boiling for the most part over the range 112°–210° C. under 6 millimeters pressure. This oil was fractionally distilled under reduced pressure, whereby the following compounds were separated:—

| Compound | B. P. at 6 mm. pressure, °C. | Sp. gr. at 20/4° C. | Refractive index $n_D^{20}$ |
|---|---|---|---|
| Mono-ethyl chlor-diphenyl-oxide | 155° to 164° | 1.163 | 1.707 |
| Di-ethyl chlor-diphenyloxide | 170° to 174° | 1.094 | 1.706 |
| A mixture of poly-ethyl chlor-diphenyloxides | 200° to 210° | 1.018 | 1.707 |

The respective yields of the compounds separated, based on the chloro-diphenyloxide reacted, were: mono-ethyl chlor-diphenyloxide 32.4%, di-ethyl chlor-diphenyloxide 6.7%, and poly-ethyl chlor-diphenyloxide 6.5%.

Example 2

4.21 moles (470 grams) of ethyl diphenyloxide (having a boiling point of 137° to 163° C. at 10 mm. pressure and a specific gravity of 1.02 20°/4° C.) was heated to and maintained at a temperature of 160° to 170° C. in an iron reactor, while 8.8 moles of gaseous chlorine was added during 8.5 hours. The chlorinated product was washed with hot aqueous sodium hydroxide solution and dried. The dried product was distilled under reduced pressure, whereby 162 grams of an oily distillate boiling chiefly over the range 120° to 170° C. at 4 mm. pressure and 383 grams of a black residual resin were obtained. The oil was redistilled, whereby the following fractions were separated:

| Composition of fraction | Boiling point | Percent chlorine |
|---|---|---|
| A mixture of ethyl monochlor- and ethyl dichlor-diphenyloxides | 140 to 165° C./5 mm. | 22.9 |
| Ethyl trichlor-diphenyloxide | 165°/at 5 mm. to 190°/at 3 mm. | 34.2 |
| A mixture of ethyl tetra-chlor- and ethyl penta-chlor-diphenyl-oxides. | 190 to 210°/at 3 mm. | 45.2 |

The resin from the initial distillation had a softening point of about 50° C., a chlorine content of 30.9 per cent, and an electrical breakdown potential of 16,000 volts per 0.1 inch.

Example 3

To a mixture of 0.2 gram-mol of anhydrous aluminum chloride and 10.0 gram moles of chlor-diphenyloxide (of the same quality as in Example 1) maintained at a temperature of 150° C. was added to 8.77 moles of gaseous propylene during 6.5 hours. The reaction mixture was washed and dried as in Example 1, whereby 2388 grams of a light oil boiling chiefly over the range 115° to 200° C. at 6 mm. pressure was obtained. This oil was then fractionally distilled at reduced pressure, whereby the following compounds were separated:

| Compound | B. P. at 6 mm. pressure, °C. | Sp. gr. at 20°/4° C. | Refractive index $n_D^{20}$ |
|---|---|---|---|
| Mono-isopropyl chlor-diphenyloxide | 156 to 169 | 1.126 | 1.5682 |
| Di-isopropyl chlor-diphenyl-oxide | 181 to 184 | 1.068 | 1.5537 |

The respective yields of the compounds separated, based on the chlor-diphenyloxide used, were: mono-isopropyl chlor-diphenyloxide 47.3%; di-isopropyl chlor-diphenyloxide 14.2%.

Example 4

A mixture of 0.2 gram-mol of anhydrous aluminum chloride and 9.0 moles of chlor-diphenyloxide (of the same quality as in Example 1) was heated to and maintained at a temperature of 85°–95° C. while 9.0 moles of tertiary butyl chloride was added during 3.5 hours. The reaction mixture was washed and dried as in Example 1, whereby 2218 grams of a light oil was obtained. This material was then fractionally distilled at reduced pressure, whereby the following compounds were separated:

| Compound | B. P. at 6 mm. pressure, °C. | Sp. gr. at 20°/4° C. | Refractive index $n_D^{20}$ |
|---|---|---|---|
| Mono-tertiary butyl chlor-diphenyloxide | 173 to 176 | 1.088 | 1.5611 |
| Di-tertiary butyl chlor-di-phenyloxide | 192 to 195 | 1.0547 | 1.5501 |
| An isomeric di-tertiary butyl chlor-diphenyl-oxide | 198 to 201 | 1.0306 | 1.5470 |

The yields of the respective compounds based on the chlor-diphenyloxide consumed were: mono-tertiary butyl chlor-diphenyloxide 52.4%, total di-tertiary butyl chlor-diphenyloxides 15.8%.

Example 5

To a mixture of 0.2 gram-mol of anhydrous aluminum chloride and 4.5 moles of dichloro-diphenyloxide (having a boiling point of 166° to 175° C. at 8 mm. pressure, a specific gravity of 1.304 20°/4° C., a refractive index of 1.5992 at 20° C., and a chlorine content of 30.5 per cent by weight) maintained at a temperature of 90° to 95° C., was added 4.61 moles of sec. butyl chloride during 0.83 hour. The reaction product was washed with concentrated hydrochloric acid, then with sodium carbonate solution and was finally dried over calcium chloride; 1158 grams of an oil boiling over the range 165° C./8 mm. to 208° C/5 mm. was obtained. This oil was fractionally distilled at reduced pressure, whereby the following compounds were separated:

| Compound | B. P. at 5 mm. pressure, °C. | Sp. gr. at 20°/24° C. | Refractive index $n_D^{20}$ |
|---|---|---|---|
| Mono-sec. butyl dichloro-diphenyloxide | 175 to 180 | 1.2014 | 1.5740 |
| Di-sec. butyl dichlor-diphenyloxide | 205 to 208 | 1.1059 | 1.5525 |

The yields of the respective compounds based on the dichlordiphenyloxide consumed were: mono-secondary butyl diphenyloxide 48.2%; di-secondary butyl diphenyloxide, 18.5%.

Example 6

To a mixture of 0.2 gram-mol of anhydrous aluminum chloride and 9.39 moles of liquid tetrachlor-diphenyloxide, (having a specific gravity of 1.487 20°/4° C., a refractive index of 1.6164 at 20° C., and a chlorine content of 47.0 per cent by weight) maintained at a temperature of about 115° C. was added 5.02 mols of propylene during 19 hours. The reaction product was washed and dried as in Example 5, whereby 2960 grams of an oil boiling over the range 95°–207° C. at 2 mm. pressure were obtained. A portion of this oil was fractionally distilled at reduced pressure, whereby the following compounds were separated:

| Compound | B. P. at 2 mm. pressure, °C. | Freezing point, °C. | Sp. gr. at 20°/4° C. | Refractive index $n_D^{20}$ |
|---|---|---|---|---|
| Mono-isopropyl tetra-chlor-diphenyloxide | 199 to 202 | −15.5 | 1.3578 | 1.6028 |
| Mono-isopropyl tetra-chlor-diphenyloxide (isomer) | 202 to 207 | −28.5 | 1.3536 | 1.6021 |

The products obtained in each of the foregoing examples possessed electrical characteristics, i. e., low dielectric constant, low power factor, high electrical resistance and high break-down potential rendering them well adapted for use as dielectric agents.

Other modes of applying the principle of our invention may be employed instead of those explained, change being made as regards the details herein disclosed, provided that the products or method stated by any of the following claims or the equivalent of such stated products or method be employed.

We, therefore, particularly point out and distinctly claim as our invention:

1. A lower alkyl-halo-diphenyloxide containing at least one lower alkyl radical having at least two carbon atoms.

2. A mixture of lower alkyl-halo-diphenyloxides each containing at least one lower alkyl radical having at least two carbon atoms.

3. A liquid non-uniformly alkylated chlor-diphenyloxide mixture comprising ethyl- and polyethyl chlordiphenyloxides as major ingredients.

4. A liquid non-uniformly alkylated chlor-diphenyloxide mixture comprising isopropyl and poly-isopropyl chlor-diphenyloxides as major ingredients.

5. Monoethyl mono-chlor-diphenyloxide, having a boiling point of 155° to 164° C. at 6 millimeters absolute pressure, a specific gravity of 1.168 20°/4° C., and a refractive index $n_D^{20}$ of 1.707.

6. Diethyl mono-chlor-diphenyloxide, having a boiling point of 170° to 174° C. at 6 millimeters absolute pressure, a specific gravity of 1.094 20°/4° C., and a refractive index $n_D^{20}$ of 1.706.

7. Mono-isopropyl mono-chlor-diphenyloxide, having a boiling point of 156° to 169° C. at 6 millimeters absolute pressure, a specific gravity of 1.126 20°/4° C., and a refractive index $n_D^{20}$ 1.567.

8. The method which comprises reacting a halo-diphenyloxide with at least one compound selected from the class consisting of lower alkyl halides and lower olefines in the presence of a Friedel-Crafts catalyst.

9. The method which comprises reacting a chlor-diphenyloxide with at least one compound selected from the class consisting of lower alkyl halides and lower olefines in the presence of a Friedel-Crafts catalyst.

GERALD H. COLEMAN.
ROBERT R. DREISBACH.